United States Patent [19]

Brown

[11] Patent Number: 4,921,429

[45] Date of Patent: May 1, 1990

[54] ROTATABLE BULB SOCKET ASSEMBLY

[76] Inventor: Mark Brown, #1711 - 420 Gloucester St., Ottawa, Ontario, Canada, K1R 7T7

[21] Appl. No.: 401,927

[22] Filed: Aug. 14, 1989

[51] Int. Cl.$^5$ .............................................. H01R 39/00
[52] U.S. Cl. ..................................... 439/26; 439/660; 439/701; 362/35
[58] Field of Search ................. 439/18, 20, 21, 23–26, 439/28, 669, 660, 665, 668, 701; 362/35, 286

[56] References Cited

U.S. PATENT DOCUMENTS

| | | | |
|---|---|---|---|
| 1,942,073 | 1/1934 | Teichman | 439/18 |
| 2,719,282 | 9/1955 | Roth | 340/25 |
| 2,812,424 | 11/1957 | Heugel | 362/286 |
| 2,843,728 | 7/1958 | Roth et al. | 362/35 |
| 2,984,738 | 5/1961 | Belau | 362/35 |
| 4,701,743 | 10/1987 | Pearlman et al. | 362/35 |

FOREIGN PATENT DOCUMENTS

| | | |
|---|---|---|
| 1005415 | 2/1977 | Canada . |
| 1008047 | 4/1977 | Canada . |
| 289678 | 1/1916 | Fed. Rep. of Germany ........ 362/35 |

*Primary Examiner*—Gary F. Paumen
*Attorney, Agent, or Firm*—Dressler, Goldsmith, Shore, Sutker & Milnamow

[57] ABSTRACT

A rotatable bulb socket assembly comprising a non-conductive cylindrical base including a hollow top portion of smaller diameter than the bottom portion for receiving a base portion of a light bulb. Current carrying members on the top portion are separated by an annular insulator and include inwardly projecting tabs for contacting terminals of the light bulb. Electrically conductive brushes slidably engaging the current carrying members are connected to a power supply. A retaining element retains the current carrying members and the insulating element on the top portion of the base. Drive means are provided for rotating the base.

6 Claims, 2 Drawing Sheets

4,921,429

ROTATABLE BULB SOCKET ASSEMBLY

FIELD OF THE INVENTION

The present invention is directed generally to the field of rotating signal or identification lamps and more particularly, to a rotating bulb socket assembly for use in such lamps.

BACKGROUND OF THE INVENTION

Rotating signal or identification lamps are employed in various contexts, for instance, as emergency warning devices on public service vehicles or as signalling means for aircraft, marine vessels, land vehicles and the like. These lamps are known to provide a number of configurations for rotatably supporting a light source, such as a bulb, and for conducting electricity thereto in a continuous manner while the signal lamp is in operation. Other such lamps provide a stationary bulb with a mechanism for rotating thereabout a reflector so as to produce a pulsating or flashing beam from the perspective of the viewer thereof.

A number of disadvantages are associated with known mechanisms for rotating light sources or reflectors therefor. For instance, some of these prior art mechanisms may be composed of heavy and expensive metallic parts. Other prior art mechanisms may provide complicated constructions for supporting and rotating a light source and for conducting electric current thereto.

SUMMARY OF THE INVENTION

As discussed in greater detail hereinbelow, the present invention provides a rotatable bulb socket assembly which is simple in construction, inexpensive to manufacture, easy to install and use, and reliable in operation, and thereby, overcomes the prior art problems discussed above.

According to one broad aspect of the invention, there is provided a rotatable bulb socket assembly comprising: a rotatable bulb socket assembly comprising:

a non-conductive base having a generally cylindrical configuration with a bottom portion and a top portion, the top portion having a hollow cross-sectional configuration of smaller diameter than the bottom portion for receiving a base portion of a light bulb;

first and second annular electrically conductive current carrying members disposed on the top portion and separated by an annular insulating element disposed on the top portion, said current carrying members having inwardly projecting tabs adapted to contact terminals of a light bulb secured in the top portion;

first and second electrically conductive brushes secured for slidable engagement with the first and second current carrying members and connectable to a source of electrical power;

a retaining element secured to the top portion for retaining said current carrying members and the insulating element on the top portion of the base; and means for rotating the base.

The rotatable bulb socket assembly of the present invention advantageously provides two conducting elements for conducting electric current to the light source employed therewith, preferably by means of a corresponding pair of contact brushes each resiliently urged against a respective conducting element. As a result, it is possible to employ lightweight and inexpensive plastic parts in a signal lamp embodying the present invention, since the presence of metallic parts for an electrical ground is rendered unnecessary for circuit completion. Consequently, the rotatable bulb socket assembly according to the present invention is ideally suited for use in a lightweight and portable signal light, as will be described in greater detail hereinbelow. However, other uses for the present invention will be apparent to those skilled in this art.

BRIEF DESCRIPTION OF THE DRAWINGS

For the purposes of illustration, but not of limitation, embodiments of the invention are described hereinbelow with reference to the following drawings in which.

DETAILED DESCRIPTION OF PREFERRED EMBODIMENTS

Figure 1:
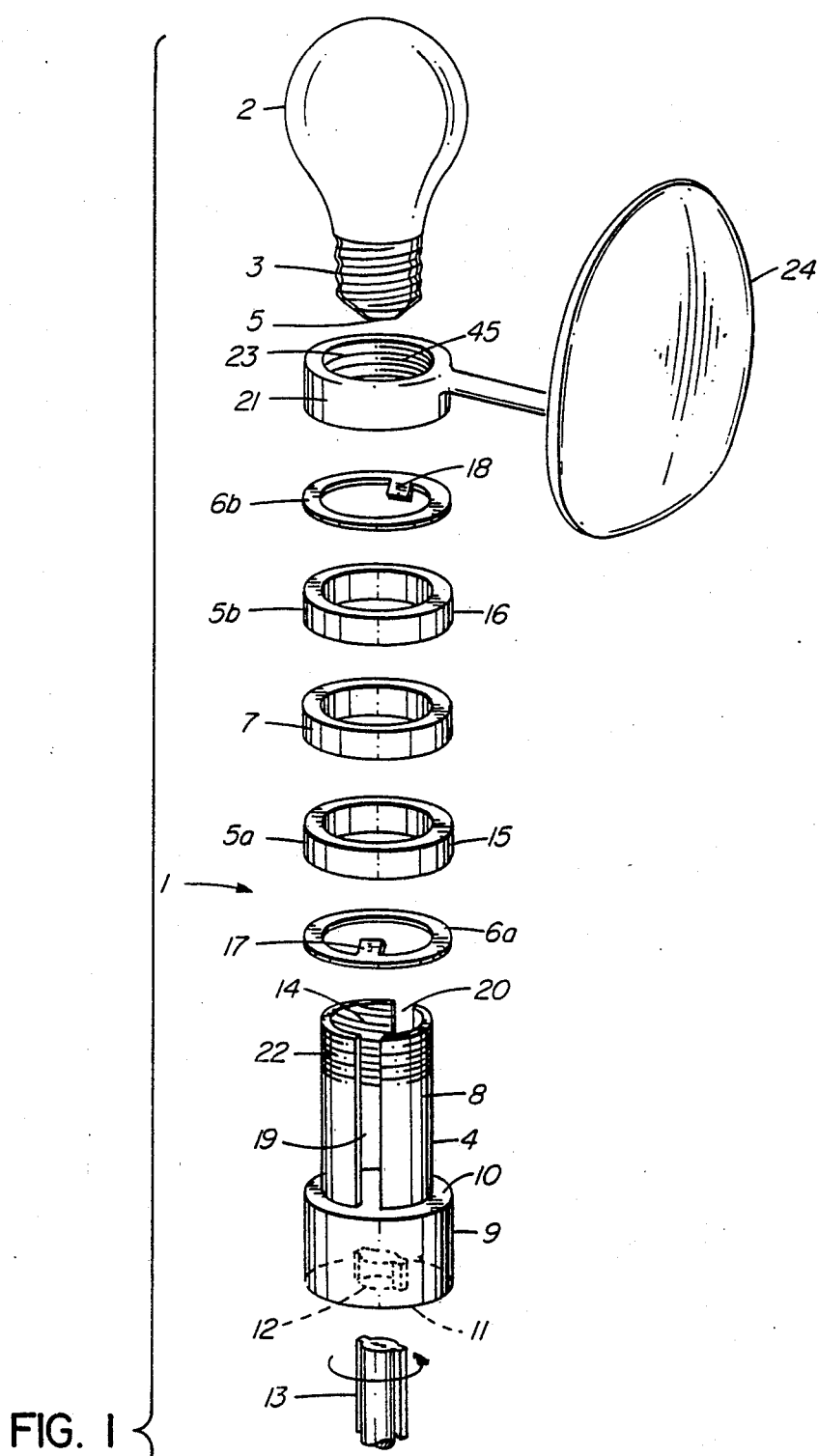
FIG. 1 is an exploded perspective view of the rotatable bulb socket assembly according to the present invention.

Referring now to the drawings, there is depicted in FIG. 1 a rotatable bulb socket assembly 1 for holding a light source, in this particular embodiment, an incandescent bulb 2. The assembly comprises a non-conducting base 4, having a generally cylindrical configuration. Base 4 consists of a top portion 8 and a bottom portion 9, the top portion having a smaller diameter than said bottom portion and being concentric therewith to thereby form a step surface 10. The undersurface 11 of base 10 may be provided with a suitably shaped keyed receptacle 12, for instance for centrally receiving the cooperating shaft 13 of a drive source for rotating the bulb socket assembly 1. Top portion 8 of base 10 has a generally hollow cylindrical configuration whose inner surface 14 may be tapped for receiving the threaded base 3 of bulb 2.

The bulb socket assembly 1 further comprises a pair of conducting annular segments 5a, 5b each being associated with respective thin contact rings 6a, 6b, which are adapted to maintain intimate electrical contact with their respective annular segments.

Lower annular segment 5a and contact ring 6a are insulated from upper annular segment 5b and contact ring 6b by means of a single insulating element 7 having a similar configuration to annular segments 5a, 5b. The respective circumferential surfaces 15 of lower annular segment 5a, and 16 of upper annular segment 5b, are adapted to make electrical contact with a source of electrical current, for instance by means of a pair of stationary brushes 17 (FIG. 2) resiliently urged thereupon. Electrical current is conducted to bulb 2 from each annular segment 5a, 5b through contact rings 6a, 6b which each respectively provide integral resilient tabs 17, 18 inwardly depending therefrom. Tab 17 is adapted to make electrical contact with nipple 5 disposed on the underside of the bulb base 3, whereas tab 18 is adapted to make such contact with the lateral surface 4 of base 3.

Annular segments 5a, 5b, contact rings 6a, 6b, and insulating element 7 are all slidably received onto non-conducting base 4 for slip-fit interconnection with top portion 8 thereof. Top portion 8 is provided with longitudinally extending keyways 19, 20 for receiving the respective tabs 17, 18. The assembly is secured by means of crown cap 21, whose interior surface 45 is tapped for interconnection with the corresponding threads 22 provided adjacent the upper lateral surface of top portion 8 of base 4. Crown cap 21 further provides an aperture 23 so that bulb 2 may be introduced therethrough for engagement as aforesaid with the tapped inner surface 14 of top portion 8. The reflector element 24 for bulb 2 may also be fixedly attached to crown cap 21.

Figure 2:
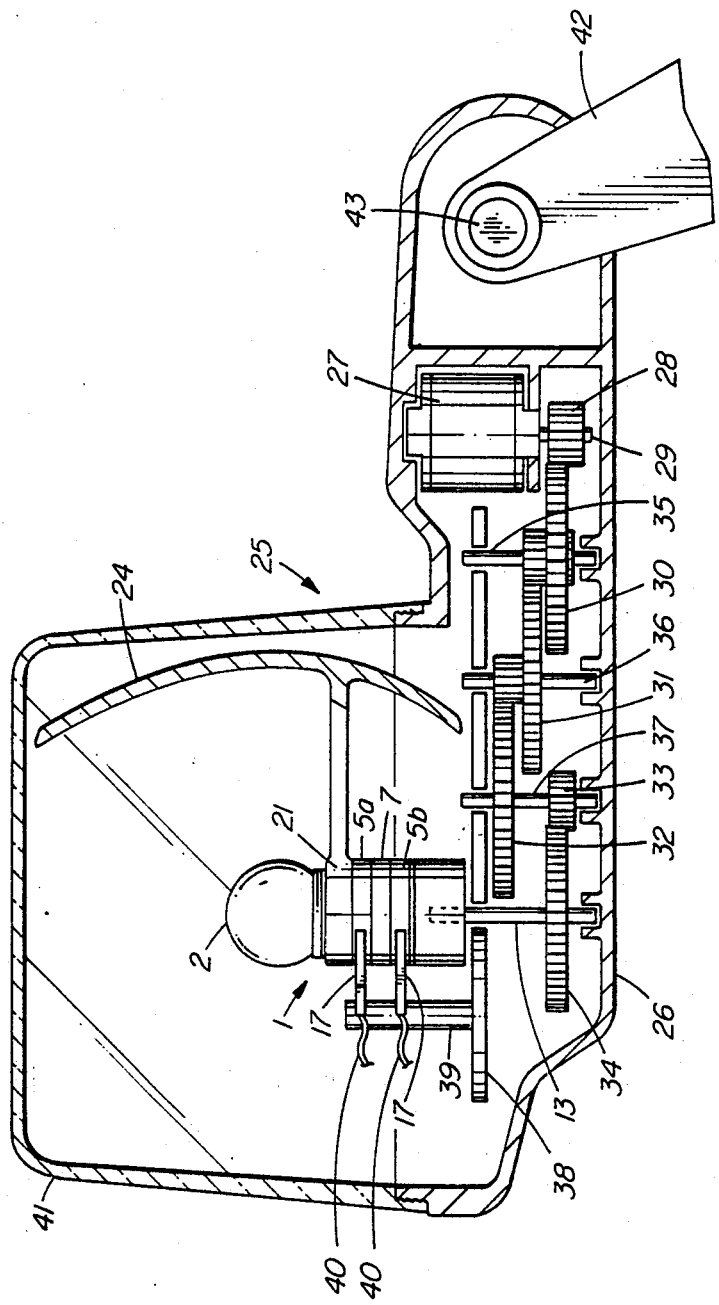
FIG. 2 is a partially cross-sectioned side elevational view of a typical portable signal light employing the rotatable bulb socket assembly depicted in FIG. 1.

Referring now to FIG. 2, the rotatable bulb socket assembly 1 is shown disposed within a portable signal light unit 25. The light unit comprises a base shell 26 which houses a drive source means, such as an electric motor 27 or the like. The motor 27 has a shaft 29 which carries a gear 28. A suitable arrangement of gears 30 through 34, fixedly attached to journaled vertical shafts 35 through 37, transmits rotative drive from gear 28 to shaft 13 of the rotatable bulb socket assembly 1. Each one of the said vertical shafts 35 through 37, has the lower end thereof rotatably attached to the inside surface of base shell 26 and the upper end thereof is likewise attached to a plate 38. Keyed shaft 13 also has its lower end rotatably attached to base shell 26, the upper end thereof extending through plate 38 and into the undersurface of base 10 of the bulb socket assembly 1 as described above. Plate 38 also supports a vertically extending post member 39 upon which are fixedly attached brushes 17. Twin leads 40 are connected to said brushes 17 for conducting thereto electric current from a suitable power source, such as a lantern battery (not shown) which also powers motor 27.

A transparent lens 41 is disposed on the upper portion of base shell 26, and covers the entire rotatable bulb socket assembly 1 as installed therein. Lens 41 may be provided in any number of colors in order to suit the particular application envisaged for signal light unit 25. A support bracket 42 may be pivotally secured to the base shell 26, as at 43, for convenient attachment of signal light unit 25 to a portable power source.

It will, of course, be understood that the present invention has been described above purely by way of example, and those skilled in this art will appreciate that various modifications of detail can be made within the scope of the invention as defined in the appended claims.

What I claim as my invention is:

1. A rotatable bulb socket assembly comprising:
    a non-conductive base having a generally cylindrical configuration with a bottom portion and a top portion, said top portion having a hollow cross-sectional configuration of smaller diameter than said bottom portion for receiving a base portion of a light bulb;
    first and second annular electrically conductive current carrying members disposed on said top portion and separated by an annular insulating element disposed on said top portion, said current carrying members having inwardly projecting tabs adapted to contact terminals of a light bulb secured in said top portion;
    first and second electrically conductive brushes secured for slidable engagement with said first and second current carrying members and connectable to a source of electrical power;
    a retaining element secured to said top portion for retaining said current carrying members and said insulating element on the top portion of said base; and
    means for rotating said base.

2. The rotatable bulb socket assembly according to claim 1, wherein said first and second current carrying members comprise first and second annular segments each having an associated contact ring for electrical engagement with said light source; said annular segments and said contact rings being slidably mounted onto the top portion of the non-conductive base.

3. The rotatable bulb socket assembly according to claim 2, wherein said top portion includes longitudinal slots in the top portion thereof for receiving each of said tabs.

4. The rotatable bulb socket assembly according to any one of claims 1, 2 or 3, wherein said light bulb is an incandescent bulb, said assembly further comprising a reflector for said bulb, said reflector being fixedly attached to said retaining element.

5. The rotatable bulb assembly according to claim 1, 2 or 3, wherein said means for rotating said base comprises an electric motor connected through gears to a drive shaft on which said base is secured.

6. The rotatable bulb assembly according to claim 1, 2 or 3, wherein said means for rotating said base comprises an electric motor connected through gears to a drive shaft on which said base is secured, said assembly being contained in a housing comprising a bottom housing portion and a transparent top housing portion, said bottom housing portion containing said motor and gears and said top housing portion containing said base and associated components.

* * * * *